(12) United States Patent
Ogino et al.

(10) Patent No.: US 12,117,076 B2
(45) Date of Patent: Oct. 15, 2024

(54) SHIFT DEVICE

(71) Applicant: AISIN CORPORATION, Kariya (JP)

(72) Inventors: Atsuto Ogino, Kariya (JP); Kota Ishikawa, Kariya (JP); Kentaro Baba, Kariya (JP)

(73) Assignee: AISIN CORPORATION, Kariya (JP)

( * ) Notice: Subject to any disclaimer, the term of this patent is extended or adjusted under 35 U.S.C. 154(b) by 528 days.

(21) Appl. No.: 17/455,264

(22) Filed: Nov. 17, 2021

(65) Prior Publication Data

US 2022/0163109 A1 May 26, 2022

(30) Foreign Application Priority Data

Nov. 25, 2020 (JP) .................................. 2020-195402

(51) Int. Cl.
*H02K 11/25* (2016.01)
*F16H 61/32* (2006.01)

(52) U.S. Cl.
CPC ............. *F16H 61/32* (2013.01); *H02K 11/25* (2016.01); *F16H 2061/326* (2013.01); *H02K 2213/09* (2013.01)

(58) Field of Classification Search
CPC ... B60W 10/10; B60W 10/02; F16H 61/2807; F16H 61/32; H02K 1/02; H02K 11/30; H02K 1/146; H02K 1/246; H02K 1/24
See application file for complete search history.

(56) References Cited

U.S. PATENT DOCUMENTS

| 5,219,391 A * | 6/1993 | Edelen .................... F16H 61/32 74/403 |
|---|---|---|
| 10,288,171 B2 | 5/2019 | Yamamoto |
| 2017/0152942 A1* | 6/2017 | Makino ................... F16H 61/32 |
| 2017/0234424 A1 | 8/2017 | Yamamoto |
| 2017/0307073 A1* | 10/2017 | Yamada ............. H02P 25/0805 |

FOREIGN PATENT DOCUMENTS

| JP | 5-256362 A | 10/1993 |
|---|---|---|
| JP | 9-9662 A | 1/1997 |
| JP | 2010-203529 A | 9/2010 |
| JP | 2017-99180 A | 6/2017 |
| JP | 2017-147818 A | 8/2017 |

* cited by examiner

*Primary Examiner* — Leda T Pham
(74) *Attorney, Agent, or Firm* — Oblon, McClelland, Maier & Neustadt, L.L.P.

(57) ABSTRACT

A shift device includes: a shift switching member including plural valleys corresponding to shift positions; a driving unit including a motor, the motor including a rotor and a stator, and configured to drive the shift switching member; a temperature detecting unit configured to detect a temperature of the motor; and a control unit configured to adjust a control gain based on the temperature detected by the temperature detecting unit.

6 Claims, 9 Drawing Sheets

FIRST CONTROL UNIT

FIG.7

SECOND CONTROL UNIT

THIRD CONTROL UNIT

FIG.10

FOURTH CONTROL UNIT

$$Vd1(t) = K_{p4} \cdot (RId - Id) + K_{i2} \cdot \int_0^t (RId - Id)dt$$

ADJUSTMENT $K_{p4}$, ADJUSTMENT $K_{i2}$, 164d

FIG.11

LINEAR INTERPOLATION

FIG.13

SHIFT DEVICE

CROSS REFERENCE TO RELATED APPLICATIONS

This application is based on and claims priority under 35 U.S.C. § 119 to Japanese Patent Application 2020-195402, filed on Nov. 25, 2020, the entire content of which is incorporated herein by reference.

TECHNICAL FIELD

This disclosure relates to a shift device, and more particularly to a shift device including a shift switching member including plural valleys corresponding to shift positions.

BACKGROUND DISCUSSION

In the related art, a shift device including a shift switching member including plural valleys corresponding to shift positions is known (see, for example, JP 2017-99180A (Reference 1)).

Reference 1 discloses a shift-by-wire system including a detent plate (the shift switching member) including plural valleys corresponding to shift positions. The shift-by-wire system includes a rotary actuator including a motor, an electronic control unit, and a shift range switching device including the detent plate. The rotary actuator rotationally drives the detent plate of the shift range switching device. The electronic control unit controls rotation of the rotary actuator. The motor includes a rotor, a stator, and an expansion member. An accommodating hole for accommodating the expansion member is formed in the rotor. The expansion member expands according to an ambient environmental temperature.

When the environmental temperature is higher than a predetermined temperature, the expansion member of Reference 1 abuts against an inner surface of the accommodating hole by expansion. Accordingly, in the motor, when the environmental temperature is higher than the predetermined temperature, no air gap is formed between the expansion member and the inner surface of the accommodating hole, and thus a magnetic flux easily flows in the rotor. As a result, when the magnetic flux becomes small due to an increase in resistance of a coil of the stator when the environmental temperature is higher than the predetermined temperature, the magnetic flux easily flows in the rotor by the expansion member.

On the other hand, when the environmental temperature is equal to or lower than the predetermined temperature, the expansion member of Reference 1 does not abut against the inner surface of the accommodating hole since it does not expand. That is, the air gap is formed between the expansion member and the inner surface of the accommodating hole. Accordingly, in the motor, when the environmental temperature is equal to or lower than the predetermined temperature, the air gap is formed between the expansion member and the inner surface of the accommodating hole, and thus the magnetic flux does not easily flow in the rotor. As a result, when the magnetic flux becomes large due to a decrease in the resistance of the coil of the stator when the environmental temperature is equal to or lower than the predetermined temperature, the magnetic flux does not easily flow in the rotor by the expansion member.

As described above, in the shift-by-wire system of Reference 1, a constant magnetic flux flows regardless of the environmental temperature by utilizing the expansion of the expansion member according to the environmental temperature.

However, in the shift-by-wire system of Reference 1, when rotation resistance of the motor becomes large due to an increase in viscosity of grease in the motor when the environmental temperature is low, a torque of the motor may be small since the magnetic flux in the motor is constant. In addition, in the shift-by-wire system of Reference 1, when the rotation resistance of the motor becomes small due to a decrease in the viscosity of the grease in the motor when the environmental temperature is high, the torque of the motor may be excessive since the magnetic flux in the motor is constant. As a result, the shift-by-wire system of Reference 1 has a problem that the torque of the motor is not stable due to the environmental temperature (an temperature of the motor).

A need thus exists for a shift device which is not susceptible to the drawback mentioned above.

SUMMARY

A shift device according to an aspect of this disclosure includes a shift switching member including plural valleys corresponding to shift positions, a driving unit including a motor, the motor including a rotor and a stator, and configured to drive the shift switching member, a temperature detecting unit configured to detect a temperature of the motor, and a control unit configured to adjust a control gain based on the temperature detected by the temperature detecting unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings.

A configuration of a shift device 100 mounted on a vehicle such as an electric vehicle will be described with reference to FIGS. 1 to 11.

Figure 1:
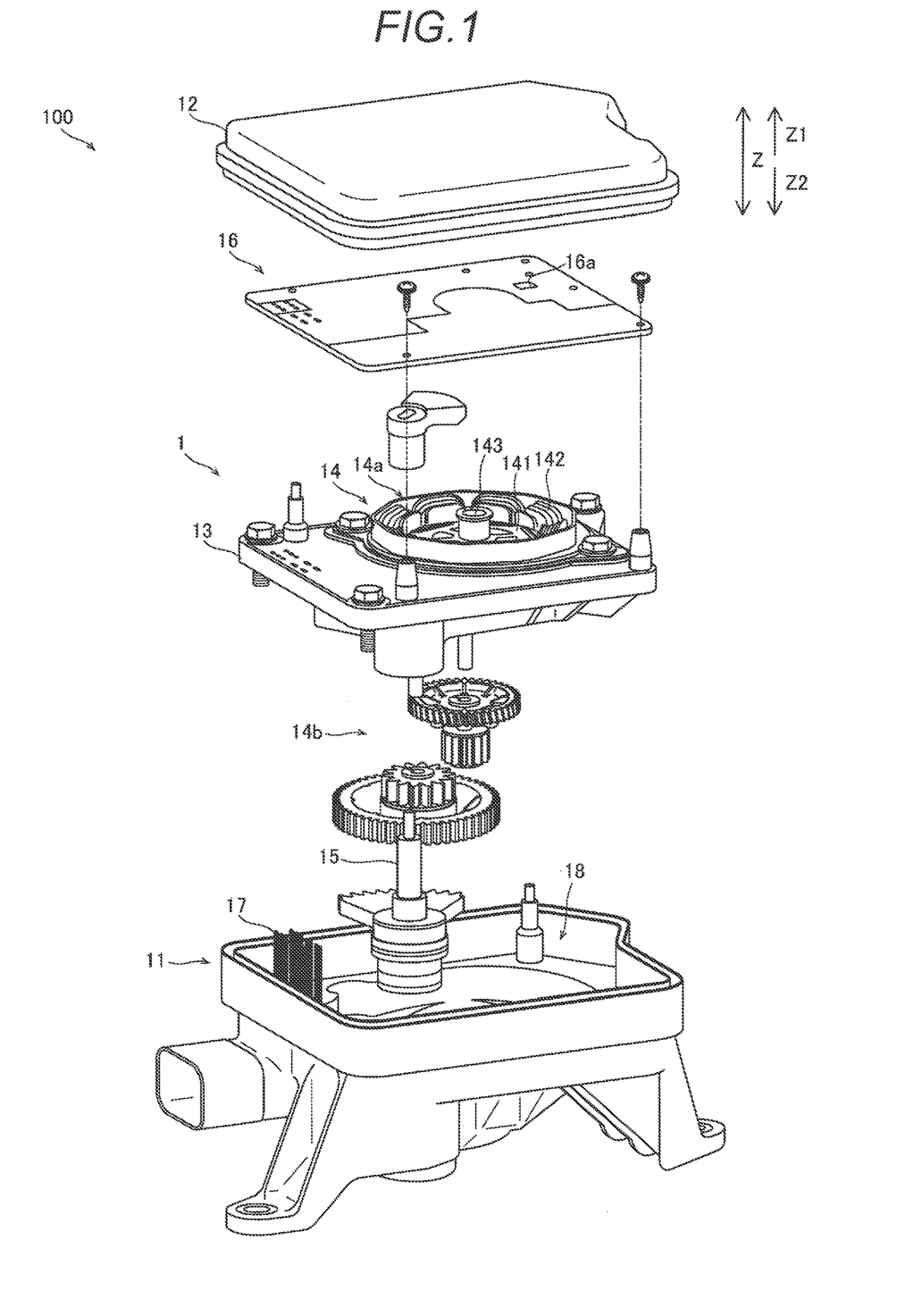
FIG. 1 is an exploded perspective view of a shift device according to an embodiment.
Figure 2:
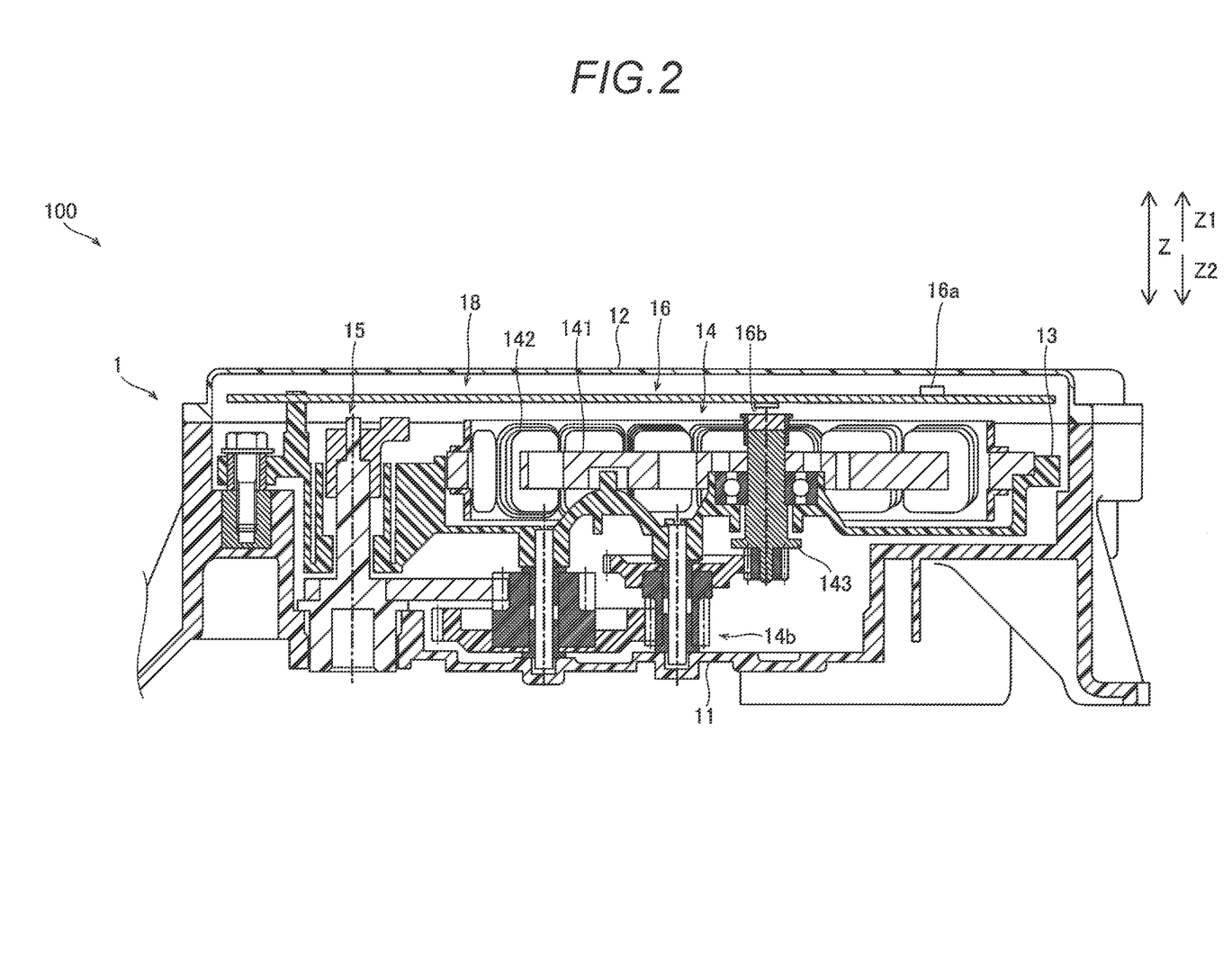
FIG. 2 is a cross-sectional view of the shift device according to the embodiment.

As shown in FIGS. 1 and 2, in the vehicle, when an occupant (a driver) performs a shift switching operation via an operation unit such as a shift lever (or a shift switch), electrical shift switching control is performed on a speed change mechanism unit. That is, a position of the shift lever is input to the shift device 100 via a shift sensor provided in the operation unit. Then, based on a control signal transmitted from a dedicated control unit (a control board) provided in the shift device 100, the speed change mechanism unit can be switched to any one of shift positions including a parking (P) position, a reverse (R) position, a neutral (N) position, and a driving (D) position corresponding to the shift operation of the occupant. Such a shift switching control is called "shift-by-wire". Each of the P, R, N, and D positions is an example of the "shift position" in claims.

The shift device 100 includes an actuator 1 and a shift switching mechanism 2 (see FIG. 3) including a shift switching member 21.

The actuator 1 is a driving device that drives the shift switching member 21 (see FIG. 3) based on the shift switching operation of the occupant (the driver). The actuator 1 includes a housing 11, an outer lid 12, an inner lid 13, a driving unit 14, an output shaft 15, a control unit 16, and a connection terminal 17. Here, the driving unit 14 is configured to drive the shift switching member 21. Specifically, the driving unit 14 includes a motor 14a and a driving force transmission mechanism 14b.

The housing 11 and the outer lid 12 define an accommodating space 18 for accommodating the motor 14a, the control unit 16, and the driving force transmission mechanism 14b. The inner lid 13 is accommodated inside the accommodating space 18, and is disposed between the driving force transmission mechanism 14b and the control unit 16.

The motor 14a is an interior permanent magnet (IPM) type brushless three-phase motor. The motor 14a is fixed to the inner lid 13 by a fastening member.

The motor 14a includes a rotor 141, a stator 142, and a shaft 143. Here, a direction in which the shaft 143 extends is referred to as a Z direction, the outer lid 12 side in the Z direction is referred to as a Z1 direction, and the housing 11 side in the Z direction is referred to as a Z2 direction.

In the rotor 141, N-pole magnets and S-pole magnets that are permanent magnets are alternately embedded at equal angular intervals around a rotation axis of the shaft 143. The stator 142 has excitation coils of plural phases (U-phase, V-phase, and W-phase) that generate a magnetic force when energized. The shaft 143 is configured to rotate together with the rotor 141 around the rotation axis.

The driving force transmission mechanism 14b is connected to the shaft 143 and is configured to transmit a driving force from the motor 14a to the output shaft 15. Here, the driving force transmission mechanism 14b is a speed reduction mechanism.

Figure 3:
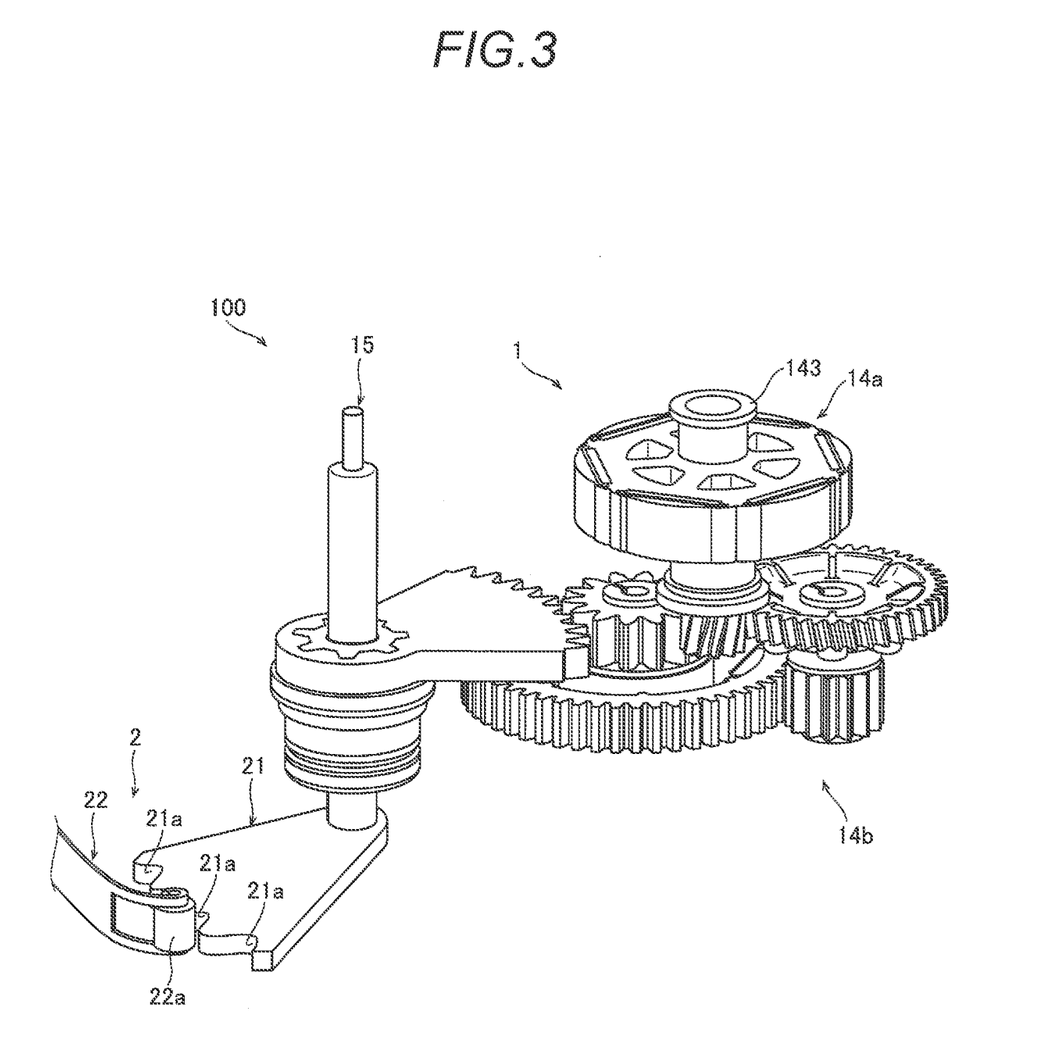
FIG. 3 is a perspective view showing a connection between a driving force transmission mechanism and a driving side member of the shift device according to the embodiment.

The output shaft 15 is configured to output the driving force of the motor 14a to the shift switching member 21 (see FIG. 3). The output shaft 15 extends in the Z direction. The output shaft 15 is connected to an output side of the driving force transmission mechanism 14b. The output shaft 15 is connected to an input side of the shift switching member 21. As a result, the output shaft 15 and the shift switching member 21 operate integrally.

The control unit 16 is configured to control the motor 14a. The control unit 16 is a control board on which electronic components are mounted. The control unit 16 includes a central processing unit (CPU), a storage unit including a random access memory (RAM) and a read only memory (ROM), a temperature detecting unit 16a, and a rotation angle sensor 16b. A motor control program for controlling the motor 14a is stored in the storage unit. The motor control program will be described later in detail.

The temperature detecting unit 16a is configured to detect a temperature of the motor 14a. In detail, the temperature detecting unit 16a detects an environmental temperature (an atmosphere temperature) in a vicinity of the motor 14a in the accommodating space 18. The rotation angle sensor 16b is a sensor that detects a rotation amount (a rotation angle) of the shaft 143.

The connection terminal 17 is a bus bar that connects a control device that is an external device and the control unit 16. The connection terminal 17 is electrically connected to a wiring cable to electrically connect the control device and the control unit 16.

As shown in FIG. 3, the shift switching mechanism 2 is connected to a manual spool valve (not shown) of a hydraulic valve body and a parking mechanism unit (not shown) in a hydraulic control circuit unit (not shown) in the speed change mechanism unit (not shown). When the shift switching mechanism 2 is driven, a shift state (the P position, the R position, the N position, and the D position) of the speed change mechanism unit is mechanically switched.

The shift switching mechanism 2 includes the shift switching member 21 and a positioning member 22 having a pin 22a. The shift switching member 21 is a detent plate. The shift switching member 21 has plural (four) valleys 21a corresponding to the shift positions (the P position, the R position, the N position, and the D position). The positioning member 22 is configured to establish a shift position in a state where the pin 22a is fitted into any one of the plural valleys 21a of the shift switching member 21 rotated by driving the actuator 1. The positioning member 22 is a detent spring. The positioning member 22 is configured to hold the detent plate at a rotation angle corresponding to the shift position (the P position, the R position, the N position, and the D position).

(Motor Control Program)

Figure 4:
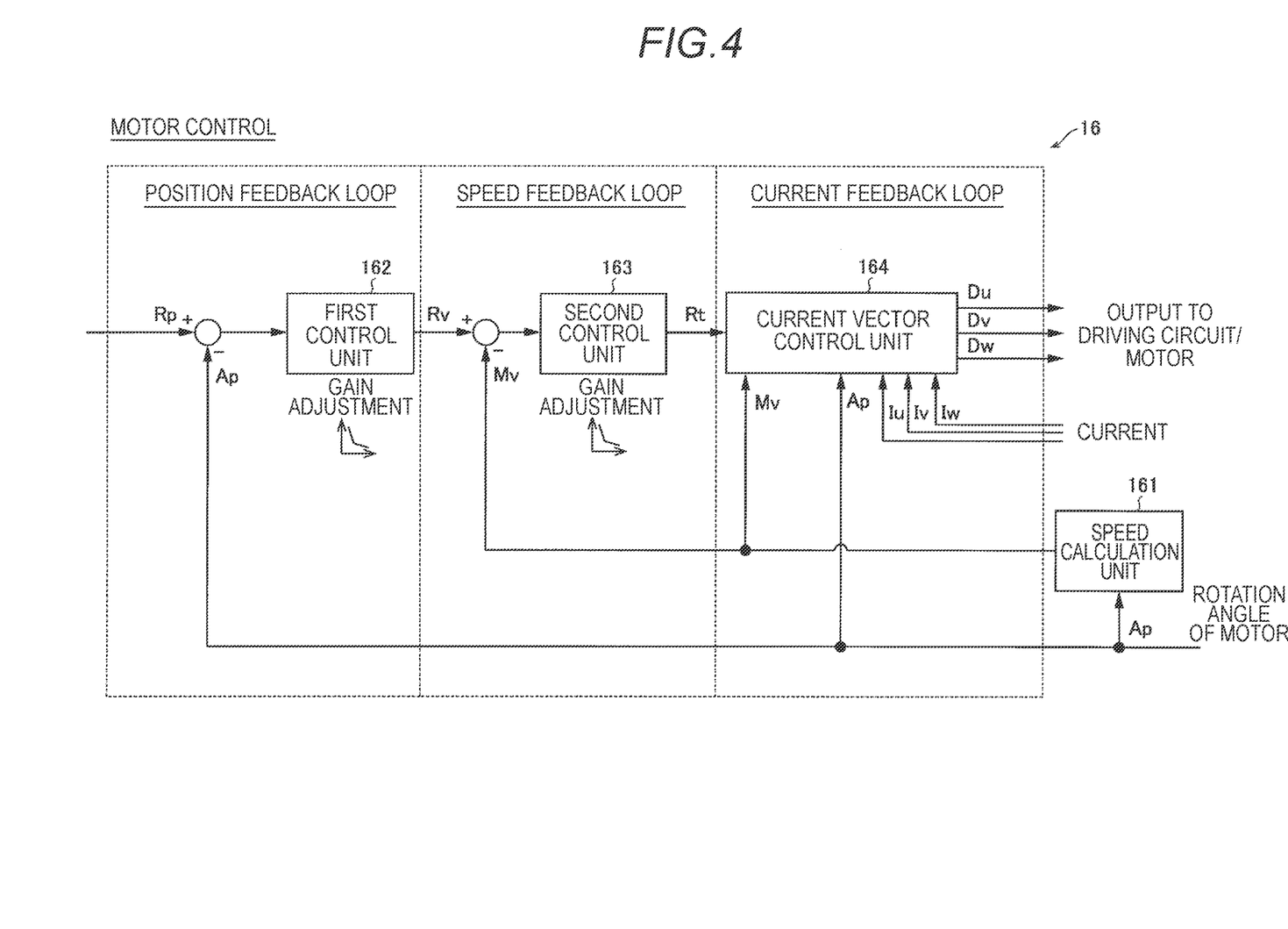
FIG. 4 is a block diagram of motor control of the shift device according to the embodiment.

As shown in FIG. 4, the control unit 16 includes, as functional blocks of the motor control program, a speed calculation unit 161, a first control unit 162, a second control unit 163, and a current vector control unit 164. The speed calculation unit 161 is configured to calculate a rotation angular speed Mv of the motor 14a based on a rotation angle Ap of the motor 14a.

The first control unit 162 is configured to calculate a target rotation angular speed Rv of the motor 14a based on a target rotation angle Rp of the motor 14a and the rotation angle Ap of the motor 14a. Specifically, the first control unit 162 is a proportional control unit (a P control unit). That is, the first control unit 162 is configured to calculate the target rotation angular speed Rv of the motor 14a by a first proportional gain Kp1 (see FIG. 6) based on a difference between the target rotation angle Rp of the motor 14a and the rotation angle Ap of the motor 14a.

The second control unit 163 is configured to calculate a target torque Rt of the motor 14a based on the target rotation angular speed Rv and the rotation angular speed Mv of the motor 14a. Specifically, the second control unit 163 is a proportional control unit (a P control unit). That is, the second control unit 163 is configured to calculate the target torque Rt of the motor 14a by a second proportional gain Kp2 (see FIG. 7) based on a difference between the target rotation angular speed Rv of the motor 14a and the rotation angular speed Mv of the motor 14a.

The current vector control unit 164 is configured to control driving of the motor 14a based on the target torque Rt calculated by the second control unit 163, the rotation angular speed Mv of the motor 14a, the rotation angle Ap of the motor 14a, and a current Iu, a current Iv, and a current Iw flowing in the motor 14a.

Figure 5:
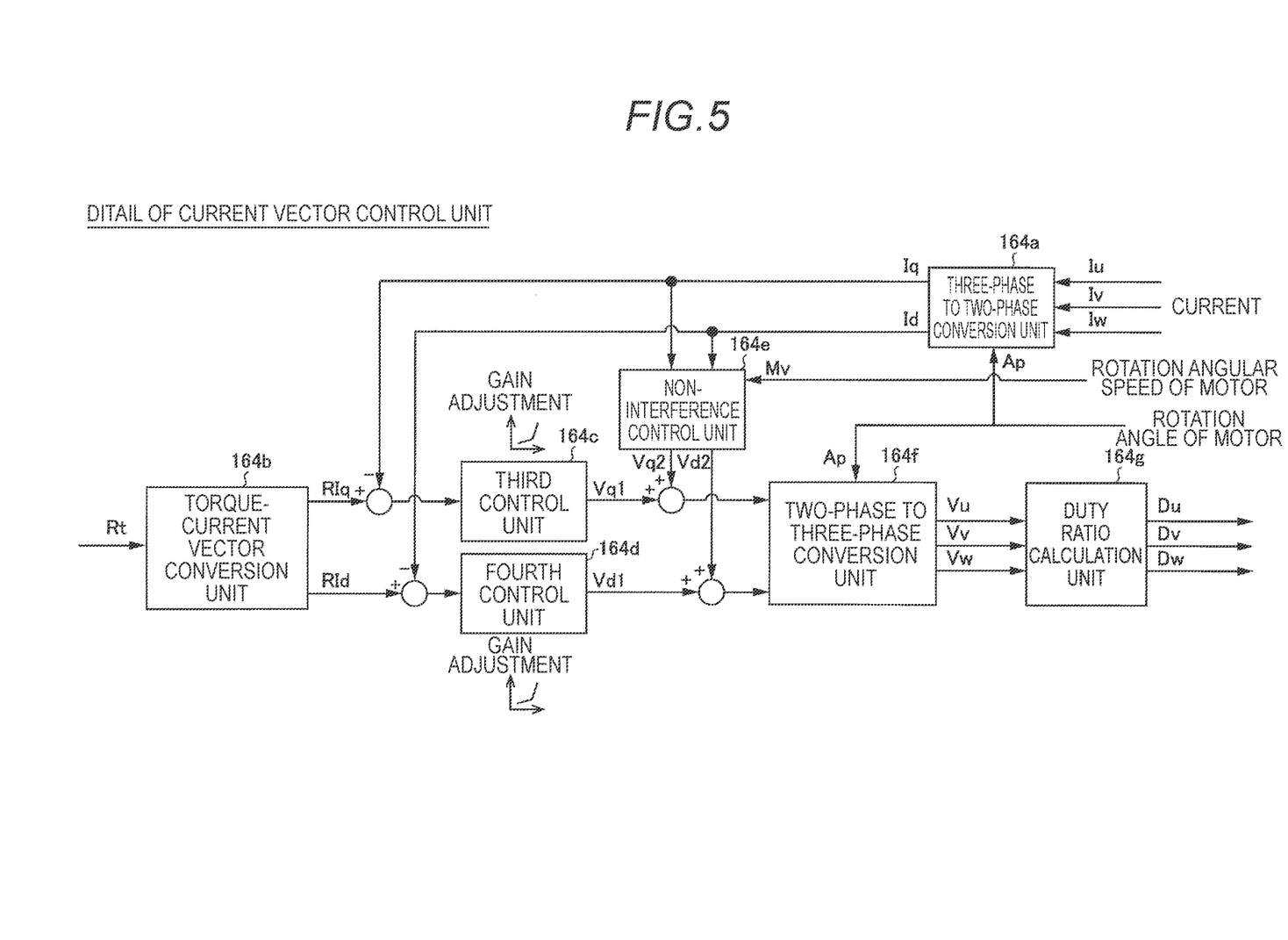
FIG. 5 is a block diagram of current vector control in the motor control of the shift device according to the embodiment.

Specifically, as shown in FIG. 5, the current vector control unit 164 includes, as functional blocks of the motor control program, a three-phase to two-phase conversion unit 164a, a torque-current vector conversion unit 164b, a third control unit 164c, a fourth control unit 164d, a non-interference control unit 164e, a two-phase to three-phase conversion unit 164f, and a duty ratio calculation unit 164g.

The three-phase to two-phase conversion unit 164a is configured to convert the current Iu, the current Iv, and the current Iw flowing in a U-phase coil, a V-phase coil, and a W-phase coil into two-phase currents Iq and Id based on the current Iu, the current Iv, the current Iw, and the rotation angle Ap. The torque-current vector conversion unit 164b is configured to convert the target torque Rt into a target current Rlq and a target current Rld.

The third control unit 164c is configured to calculate a voltage Vq1 based on the target current Rlq of the motor 14a and the current Iq. Specifically, the third control unit 164c is a proportional integral control unit (a PI control unit). That is, the third control unit 164c is configured to calculate the voltage Vq1 by a third proportional gain Kp3 (see FIG. 9) and a first integral gain Ki1 (see FIG. 9) based on a difference between the target current Rlq of the motor 14a and the current Iq.

The fourth control unit 164d is configured to calculate a voltage Vd1 based on the target current Rld of the motor 14a and the current Id. Specifically, the fourth control unit 164d is a proportional integral control unit (the PI control unit). That is, the fourth control unit 164d is configured to calculate the voltage Vd1 by a fourth proportional gain Kp4 (see FIG. 10) and a second integral gain Ki2 (see FIG. 10) based on a difference between the target current Rld of the motor 14a and the current Id.

The non-interference control unit 164e is configured to calculate a voltage Vq2 and a voltage Vd2 that suppress an influence of an interference when the two-phase to three-phase conversion unit 164f converts a two-phase voltage into a three-phase voltage, based on the rotation angular speed Mv of the motor 14a, the current Iq, and the current Id. The two-phase to three-phase conversion unit 164f is configured to convert the voltage Vq1+the voltage Vq2 and the voltage Vd1+the voltage Vd2, which are two-phase voltages, into three-phase voltages Vu, Vv, and Vw based on the rotation angle Ap, the voltage Vq1+the voltage Vq2, and the voltage Vd1+the voltage Vd2, which are two-phase voltages. The duty ratio calculation unit 164g is configured to calculate a duty ratio Du, a duty ratio Dv, and a duty ratio Dw based on the three-phase voltages Vu, Vv, and Vw.

(Adjustment of Control Gain)

As shown in FIGS. 6 to 11, the control unit 16 of the present embodiment is able to calculate the duty ratio Du, the duty ratio Dv, and the duty ratio Dw in accordance with temperature characteristics of the motor 14a that change depending on resistance of the coils and a viscosity of grease. That is, the control unit 16 is configured to adjust a control gain based on a temperature detected by the temperature detecting unit 16a. In detail, the control unit 16 performs control to change the first proportional gain Kp1, the second proportional gain Kp2, the third proportional gain Kp3, the fourth proportional gain Kp4, the first integral gain Ki1, and the second integral gain Ki2 that are control gains according to the temperature (the environmental temperature) of the motor 14a detected by the temperature detecting unit 16a.

First, adjustments of the first proportional gain Kp1 of the first control unit 162 and the second proportional gain Kp2 of the second control unit 163 will be described with reference to FIG. 6 to FIG. 8.

Figure 6:
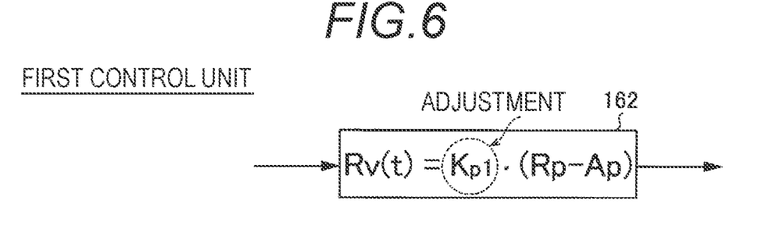
FIG. 6 is a block diagram of a first control unit in the motor control of the shift device according to the embodiment.
Figure 7:
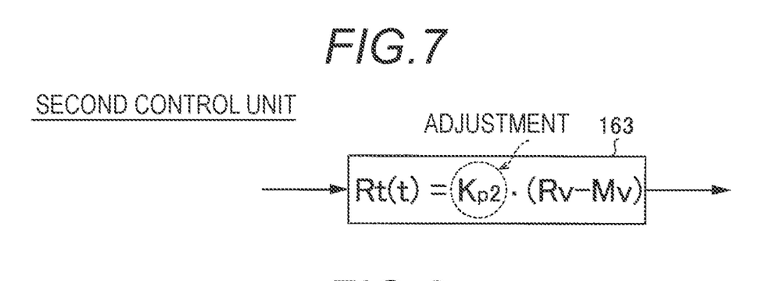
FIG. 7 is a block diagram of a second control unit in the motor control of the shift device according to the embodiment.

As shown in FIGS. 6 and 7, the control unit 16 is configured to adjust the control gains included in the first control unit 162 and the second control unit 163 based on the temperature detected by the temperature detecting unit 16a. That is, the control unit 16 is configured to adjust the first proportional gain Kp1 of the first control unit 162 and the second proportional gain Kp2 of the second control unit 163 based on the temperature detected by the temperature detecting unit 16a. Hereinafter, an example of the adjustment of the first proportional gain Kp1 will be described. Since the adjustment of the second proportional gain Kp2 is the same as the adjustment of the first proportional gain Kp1, the description thereof will be omitted.

Figure 8:
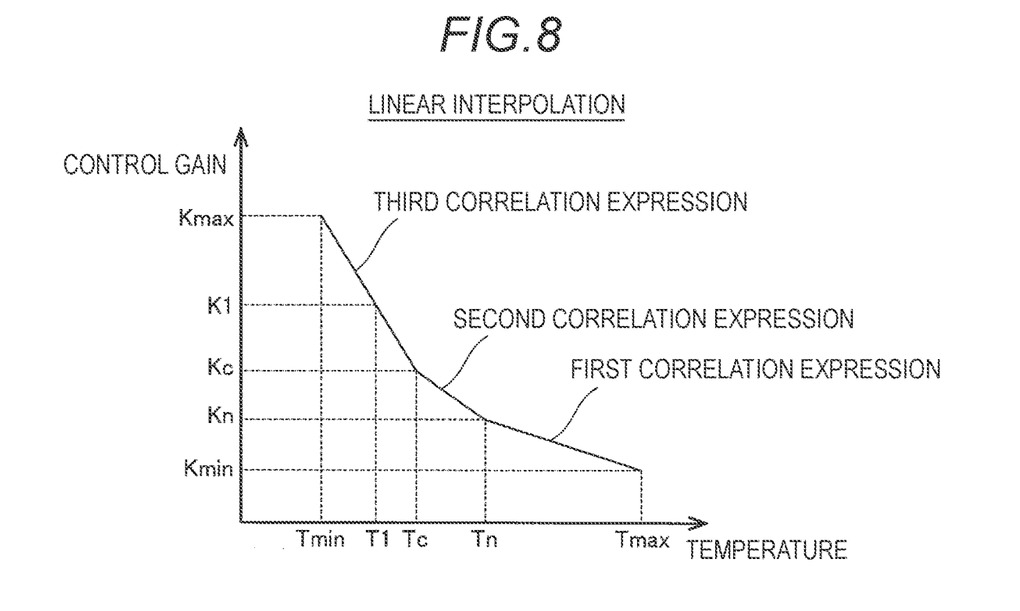
FIG. 8 is a schematic diagram showing an example of a correlation expression of a linear interpolation applied to the first control unit and the second control unit in the motor control of the shift device according to the embodiment.

Specifically, as shown in FIG. 8, the control unit 16 performs control to estimate the first proportional gain Kp1 (the control gain) corresponding to the temperature detected by the temperature detecting unit 16a by a linear interpolation based on an upper limit side temperature of a use temperature range (for example, −40° C. to 120° C.) and an upper limit side control gain that is a control gain corresponding to the upper limit side temperature, and a lower limit side temperature of the use temperature range and a lower limit side control gain that is a control gain corresponding to the lower limit side temperature.

In detail, the control unit 16 performs control to estimate the control gain by a linear interpolation based on an upper limit temperature Tmax and an upper limit control gain Kmax, a change point Tc and a change point control gain Kc, a predetermined temperature Tn and a predetermined control gain Kn, and a lower limit temperature Tmin and a lower limit control gain Kmin.

Here, the upper limit temperature Tmax is an example of the upper limit side temperature. The upper limit temperature Tmax is, for example, 120° C. The upper limit control gain Kmax is an example of the upper limit side control gain. The change point Tc is a temperature at which a slope of a correlation expression defined by the temperature detected by the temperature detecting unit 16a and the control gain changes. The change point Tc is, for example, −10° C. The change point control gain Kc is a control gain corresponding to the change point Tc. The predetermined temperature Tn is a temperature between the change point Tc and the upper limit temperature Tmax (the upper limit side temperature).

The predetermined temperature Tn is, for example, 20° C. The predetermined control gain Kn is a control gain corresponding to the predetermined temperature Tn. The lower limit temperature Tmin is an example of the lower limit side temperature. The lower limit temperature Tmin is, for example, −40° C. The lower limit control gain Kmin is an example of the lower limit side control gain.

That is, when the temperature detected by the temperature detecting unit 16a is equal to or higher than the predetermined temperature Tn and equal to or lower than the upper limit temperature Tmax, the control unit 16 performs control to estimate the first proportional gain Kp1 (the control gain) by a linear interpolation based on a first correlation expression acquired by the upper limit temperature Tmax and the upper limit control gain Kmax and the predetermined temperature Tn and the predetermined control gain Kn. The first correlation expression is a linear expression indicating a correlation between the temperature and the control gain. In the first correlation expression, the control gain decreases as the temperature increases.

In addition, when the temperature detected by the temperature detecting unit 16a is equal to or higher than the change point Tc and less than the predetermined temperature Tn, the control unit 16 performs control to estimate the first proportional gain Kp1 (the control gain) by a linear interpolation based on a second correlation expression acquired by the predetermined temperature Tn and the predetermined control gain Kn and the change point Tc and the change point control gain Kc. The second correlation expression is a linear expression indicating a correlation between the temperature and the control gain. In the second correlation expression, the control gain decreases as the temperature increases.

When the temperature detected by the temperature detecting unit 16a is equal to or higher than the lower limit temperature Tmin and less than the change point Tc, the control unit 16 performs control to estimate the first proportional gain Kp1 (the control gain) by a linear interpolation based on a third correlation expression acquired by the lower limit temperature Tmin and the lower limit control gain Kmin and the change point Tc and the change point control gain Kc. The third correlation expression is a linear expression indicating a correlation between the temperature and the control gain. In the third correlation expression, the control gain decreases as the temperature increases.

Here, for example, when the temperature of the motor 14a is a temperature T1, a control gain K1 is calculated by calculation of $K1=Kmax+(Kc-Kmax)\times(T1-Tmin)/(Tc-T1)$ by the third correlation expression. The calculated control gain K1 is applied to the first control unit 162 as the first proportional gain Kp1. Similarly, the control gain corresponding to the temperature of the motor 14a is calculated by the first correlation expression and the second correlation expression.

Next, adjustments of the third proportional gain Kp3 of the third control unit 164c, the first integral gain Ki1 of the third control unit 164c, the fourth proportional gain Kp4 of the fourth control unit 164d, and the second integral gain Ki2 of the fourth control unit 164d will be described with reference to FIGS. 9 to 11.

Figure 9:
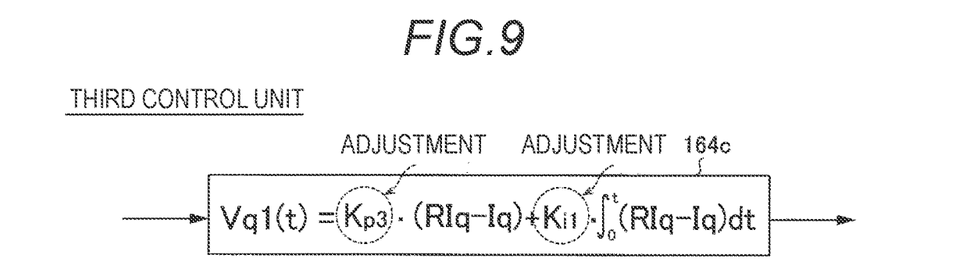
FIG. 9 is a block diagram of a third control unit in the motor control of the shift device according to the embodiment.
Figure 10:
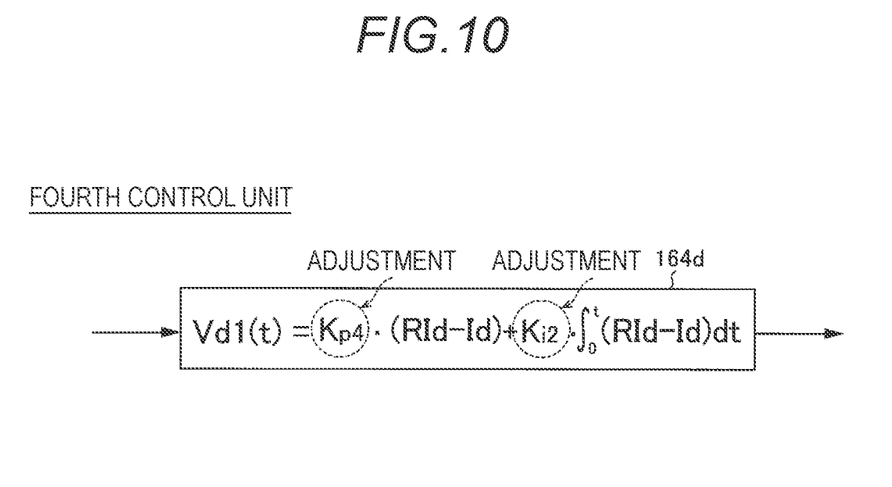
FIG. 10 is a block diagram of a fourth control unit in the motor control of the shift device according to the embodiment.

As shown in FIGS. 9 and 10, the control unit 16 adjusts a control gain of the current vector control unit 164 based on the temperature detected by the temperature detecting unit 16a. The control unit 16 adjusts control gains included in the third control unit 164c and the fourth control unit 164d based on the temperature detected by the temperature detecting unit 16a. That is, the control unit 16 adjusts the third proportional gain Kp3 of the third control unit 164c, the first integral gain Ki1 of the third control unit 164c, the fourth proportional gain Kp4 of the fourth control unit 164d, and the second integral gain Ki2 of the fourth control unit 164d based on the temperature detected by the temperature detecting unit 16a. Hereinafter, an example of the adjustment of the third proportional gain Kp3 will be described. Since the adjustments of the first integral gain Ki1 of the third control unit 164c, the fourth proportional gain Kp4 of the fourth control unit 164d, and the second integral gain Ki2 of the fourth control unit 164d are the same as the adjustment of the third proportional gain Kp3, the description thereof will be omitted.

Figure 11:
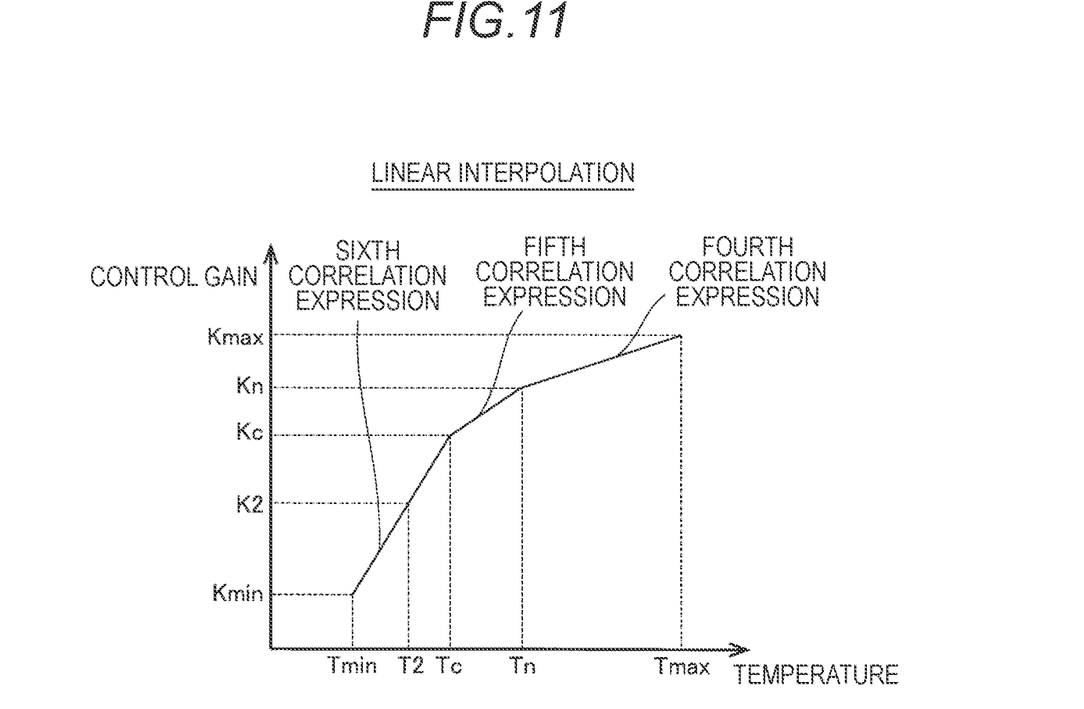
FIG. 11 is a schematic diagram showing an example of a correlation expression of a linear interpolation applied to the third control unit and the fourth control unit in the motor control of the shift device according to the embodiment.

Specifically, as shown in FIG. 11, the control unit 16 performs control to estimate the third proportional gain Kp3 (the control gain) corresponding to the temperature detected by the temperature detecting unit 16a by the linear interpolation based on the upper limit side temperature of the use temperature range (for example, −40° C. to 120° C.) and the upper limit side control gain that is the control gain corresponding to the upper limit side temperature, and the lower limit side temperature of the use temperature range and the lower limit side control gain that is the control gain corresponding to the lower limit side temperature.

In detail, the control unit 16 performs control to estimate the control gain by a linear interpolation based on the upper limit temperature Tmax and the upper limit control gain Kmax, the change point Tc and the change point control gain Kc, the predetermined temperature Tn and the predetermined control gain Kn, and the lower limit temperature Tmin and the lower limit control gain Kmin.

That is, when the temperature detected by the temperature detecting unit 16a is equal to or higher than the predetermined temperature Tn and equal to or lower than the upper limit temperature Tmax, the control unit 16 performs control to estimate the third proportional gain Kp3 (the control gain) by a linear interpolation based on a fourth correlation expression acquired by the upper limit temperature Tmax and the upper limit control gain Kmax and the predetermined temperature Tn and the predetermined control gain Kn. The fourth correlation expression is a linear expression indicating a correlation between the temperature and the control gain. In the fourth correlation expression, the control gain increases as the temperature increases.

In addition, when the temperature detected by the temperature detecting unit 16a is equal to or higher than the change point Tc and less than the predetermined temperature Tn, the control unit 16 performs control to estimate the third proportional gain Kp3 (the control gain) by a linear interpolation based on a fifth correlation expression acquired by the predetermined temperature Tn and the predetermined control gain Kn and the change point Tc and the change point control gain Kc. The fifth correlation expression is a linear expression indicating a correlation between the temperature and the control gain. In the fifth correlation expression, the control gain increases as the temperature increases.

When the temperature detected by the temperature detecting unit 16a is equal to or higher than the lower limit temperature Tmin and less than the change point Tc, the control unit 16 performs control to estimate the third proportional gain Kp3 (the control gain) by a linear interpolation based on a sixth correlation expression acquired by the lower limit temperature Tmin and the lower limit control gain Kmin and the change point Tc and the change point control gain Kc. The sixth correlation expression is a linear expression indicating a correlation between the temperature and the control gain. In the sixth correlation expression, the control gain increases as the temperature increases.

Here, for example, when the temperature of the motor 14a is a temperature T2, a control gain K2 is calculated by calculation of K2=Kmin+(Kc−Kmin)×(T2−Tmin)/(Tc−Tmin) by the sixth correlation expression. The calculated control gain K2 is applied to the third control unit 164c as the third proportional gain Kp3. Similarly, the control gain corresponding to the temperature of the motor 14a is calculated by the fourth correlation expression and the fifth correlation expression.

The adjustments of the control gains using the linear interpolations described above are performed only at an initial stage of the control of the motor 14a to suppress an increase in a process load of the control unit 16. That is, the control unit 16 adjusts the control gain in the initial stage of the driving of the motor 14a. In detail, the control unit 16 adjusts the control gain in a first cycle of control cycles for the motor 14a in the initial stage of the driving of the motor 14a. That is, the control unit 16 adjusts the control gain only in a control cycle immediately after receiving a shift position switching request from the control device.

In addition, in the adjustments of the control gains using the linear interpolations described above, when the temperature detecting unit 16a fails, an appropriate control gain is not calculated, and thus a smallest control gain is applied for safety. That is, when the temperature detecting unit 16a fails, the control unit 16 performs control to set the control gain to a smaller one of a high temperature side control gain corresponding to a high temperature side temperature detected by the temperature detecting unit 16a and a low temperature side control gain corresponding to a low temperature side temperature detected by the temperature detecting unit 16a. Here, the case where the temperature detecting unit 16a fails refers to a case where an output value of the sensor is fixed to an upper limit value or a lower limit value. In detail, in the first control unit 162 and the second control unit 163, when the temperature detecting unit 16a fails, the control unit 16 performs control to set the lower limit control gain Kmin corresponding to the upper limit temperature Tmax of the use temperature range as the control gain. In addition, in the third control unit 164c and the fourth control unit 164d, when the temperature detecting unit 16a fails, the control unit 16 performs control to set the lower limit control gain Kmin corresponding to the lower limit temperature Tmin of the use temperature range as the control gain.

By the adjustments of the control gains using such linear interpolations, the control gains are adjusted to different gains according to types of operation of the shift device 100. That is, the control unit 16 adjusts the control gain such that the control gain changes according to the temperature detected by the temperature detecting unit 16a and the types of the operation. In detail, the control unit 16 adjusts the control gain such that the control gain changes according to a learning operation (position learning) of a valley bottom position of each of the plural valleys into which the positioning member 22 is fitted and a switching operation of the shift positions by changing one of the plural valleys into which the positioning member 22 is fitted as the types of the operation. That is, the first to sixth correlation expressions applied in the learning operation for each control gain are stored in the storage unit, and additional first to sixth correlation expressions applied in the shift switching operation for each control gain are stored in the storage unit.

The learning operation of the valley bottom position is performed at the time of factory shipment of the vehicle, inspection at a dealer, or the like. Here, the control device notifies the control unit 16 that the learning operation of the valley bottom position is performed based on an operator selecting a learning operation mode of the valley bottom position. The shift switching operation is performed during a normal driving performed by a user. Here, the control device notifies the control unit 16 that the shift switching operation is performed based on the operator switching the learning operation mode of the valley bottom position to the shift switching operation mode.

(Control Gain Adjustment Process)

Figure 12:
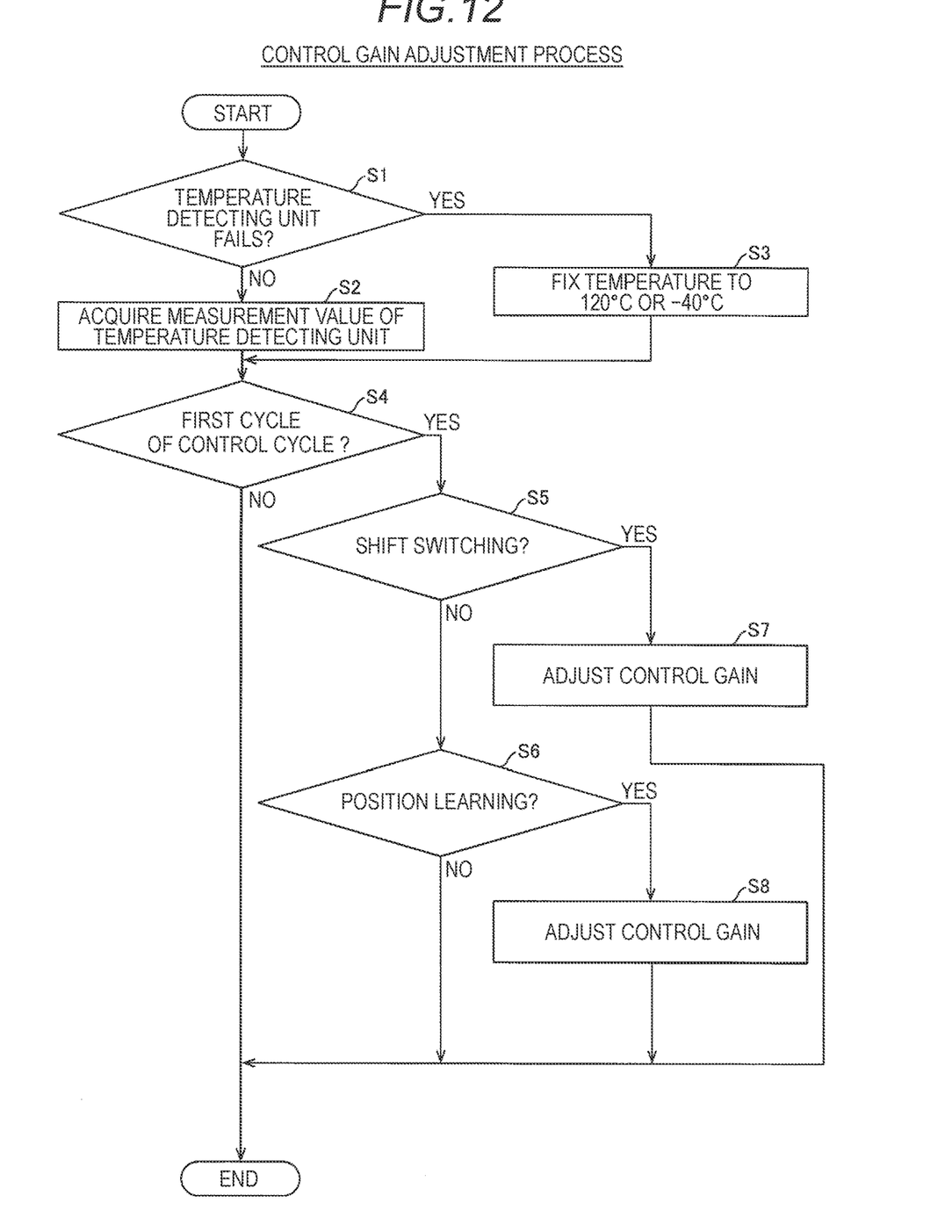
FIG. 12 is a flowchart showing a control gain adjustment process of the shift device according to the embodiment.

Hereinafter, a control gain adjustment process performed by the control unit 16 will be described with reference to FIG. 12. The control gain adjustment process is a process of adjusting the control gain according to the environmental temperature (the atmosphere temperature) around the motor 14a.

In step S1, the control unit 16 determines whether the temperature detecting unit 16a fails. That is, the control unit 16 determines whether the output value of the temperature detecting unit 16a is fixed to the upper limit value or the lower limit value. When the temperature detecting unit 16a does not fail, the process proceeds to step S2, and a measurement value measured by the temperature detecting unit 16a is acquired. When the temperature detecting unit 16a fails, the process proceeds to step S3, and the environmental temperature as the measurement value measured by the temperature detecting unit 16a is fixed to 120° C. or −40° C. In detail, in the first control unit 162 and the second control unit 163, the environmental temperature is fixed to 120° C. In addition, in the third control unit 164c and the fourth control unit 164d, the environmental temperature is fixed to −40° C.

In step S4, the control unit 16 determines whether the control cycle is the first cycle. When the control cycle is not the first cycle, the control gain adjustment process is ended. In addition, when the control cycle is the first cycle, the process proceeds to step S5.

In step S5, the control unit 16 determines whether the type of the operation of the shift device 100 notified from the control device is the shift switching operation. When the type of the operation of the shift device 100 is not the shift switching operation, the process proceeds to step S6. When the type of the operation of the shift device 100 is the shift switching operation, the process proceeds to step S7. In step S7, the control gain is adjusted. That is, the first proportional gain Kp1, the second proportional gain Kp2, the third proportional gain Kp3, the fourth proportional gain Kp4, the first integral gain Ki1, and the second integral gain Ki2 are adjusted based on the first to sixth correlation expressions applied in the shift switching operation and the temperature acquired from the temperature detecting unit 16a. In addition, when the temperature detecting unit 16a fails, the first proportional gain Kp1, the second proportional gain Kp2, the third proportional gain Kp3, the fourth proportional gain Kp4, the first integral gain Kit, and the second integral gain Ki2 are adjusted to the smallest control gain. Then, after step S7, the control gain adjustment process is ended.

In step S6, the control unit 16 determines whether the type of the operation of the shift device 100 notified from the control device is the position learning operation. When the type of the operation of the shift device 100 is not the position learning operation, the control gain adjustment process is ended. When the type of the operation of the shift device 100 is the position learning operation, the process proceeds to step S8. In step S8, the control gain is adjusted. That is, the first proportional gain Kp1, the second proportional gain Kp2, the third proportional gain Kp3, the fourth proportional gain Kp4, the first integral gain Kit, and the second integral gain Ki2 are adjusted based on the first to sixth correlation expressions applied in the position learning operation and the temperature acquired from the temperature detecting unit 16a. In addition, when the temperature detecting unit 16a fails, the first proportional gain Kp1, the second proportional gain Kp2, the third proportional gain Kp3, the fourth proportional gain Kp4, the first integral gain Kit, and the second integral gain Ki2 are adjusted to the smallest control gain. Then, after step S8, the control gain adjustment process is ended.

Effects of Present Embodiment

In the present embodiment, the following effects can be obtained.

In the present embodiment, as described above, the control unit 16 configured to adjust the control gain based on the temperature detected by the temperature detecting unit 16a is provided. Accordingly, by adjusting the control gain based on the temperature of the motor 14a detected by the temperature detecting unit 16a, the voltage supplied to the motor 14a can be appropriately adjusted in accordance with a change in the resistance of the coils of the motor 14a and a change in the viscosity of the grease due to a temperature change, and thus a magnetic flux flowing through the motor 14a can be appropriately adjusted. As a result, the torque of the motor 14a can be stabilized regardless of the temperature of the motor 14a.

In addition, in the present embodiment, as described above, the control unit 16 adjusts the control gain at the initial stage of the driving of the motor 14a. Accordingly, by adjusting the control gain at the initial stage of the driving of the motor 14a, the voltage supplied to the motor 14a can be appropriately adjusted from the initial stage of the driving of the motor 14a, and thus the magnetic flux flowing through the motor 14a can be appropriately adjusted from the initial stage of the driving of the motor 14a. As a result, the motor 14a can output a stable torque from the initial stage of the driving regardless of the temperature of the motor 14a.

In addition, in the present embodiment, as described above, when the temperature detecting unit 16a fails, the control unit 16 performs control to set the control gain to a smaller one of the high temperature side control gain corresponding to the high temperature side temperature detected by the temperature detecting unit 16a and the low temperature side control gain corresponding to the low temperature side temperature detected by the temperature detecting unit 16a. Accordingly, when the temperature detecting unit 16a fails, the smaller one of the high temperature side control gain and the low temperature side control gain is applied as the control gain, and thus the driving force of the motor 14a can be reduced. As a result, since the shift switching member 21 can be moved slowly, even if the temperature detecting unit 16a fails, the shift switching member 21 can be prevented from being excessively moved (overshoot) to a rotation angle according to the shift position.

In addition, in the present embodiment, as described above, the control unit 16 performs control to estimate the control gain corresponding to the temperature detected by the temperature detecting unit 16a by the linear interpolation based on the upper limit side temperature and the upper limit side control gain, and the lower limit side temperature and the lower limit side control gain. Accordingly, the control gain can be estimated when the upper limit side control gain and the lower limit side control gain are stored in the storage unit, and thus a storage capacity necessary for the storage unit of the control unit 16 can be reduced as compared with a case where the control gain is estimated by a map based on the temperature of the motor and the control gain corresponding to the temperature of the motor.

In addition, in the present embodiment, as described above, the control unit 16 adjusts the control gain such that the control gain changes according to the temperature detected by the temperature detecting unit 16a and the types of the operation. Accordingly, the control gain can be adjusted not only according to the temperature detected by the temperature detecting unit 16a but also according to the types of the operation, and thus the control gain can be adjusted to a more appropriate control gain.

In addition, in the present embodiment, as described above, the shift device 100 is provided with the positioning member 22 that establishes a shift position in a state of being fitted into any one of the plural valleys 21a of the shift switching member 21. The control unit 16 adjusts the control gain such that the control gain changes according to the learning operation of the valley bottom position and the switching operation of the shift positions as the types of the operation. Accordingly, the motor 14a can be driven with an appropriate control gain during the learning operation of the valley bottom position and the shift switching operation, and thus the positioning member 22 can be reliably fitted into the plural valleys 21a of the positioning member 22 regardless of whether the learning operation or the shift switching operation is performed.

Modification

The embodiment disclosed herein should be considered as illustrative and non-restrictive in every respect. The scope of this disclosure is shown by the claims rather than the description of the embodiment described above and further includes all changes (modifications) within meaning and scope equivalent to the claims.

For example, in the embodiment, an example is shown in which the control unit 16 adjusts the control gain in the initial stage of the driving of the motor 14a, and this disclosure is not limited thereto. In this disclosure, the control unit may perform control to adjust the control gain for each driving of the motor.

In addition, in the embodiment described above, an example is shown in which the control unit 16 performs control to set the control gain to the high temperature side control gain corresponding to the high temperature side temperature detected by the temperature detecting unit 16a when the temperature detecting unit 16a fails, and this disclosure is not limited thereto. In this disclosure, the control unit may stop the control operation when the temperature detecting unit fails.

In addition, in the embodiment described above, an example is shown in which the control unit 16 performs control to estimate the control gain corresponding to the temperature detected by the temperature detecting unit 16a by the linear interpolation based on the upper limit side temperature and the upper limit side control gain, and the lower limit side temperature and the lower limit side control gain, and this disclosure is not limited thereto. In this disclosure, the control unit may perform control to estimate the control gain corresponding to the temperature detected by the temperature detecting unit according to a table based on the temperature (the environmental temperature) of the motor and the control gain.

In addition, in the embodiment described above, an example is shown in which the control unit 16 adjusts the control gain such that the control gain changes according to the temperature detected by the temperature detecting unit 16a and the types of the operation, and this disclosure is not limited thereto. In this disclosure, the control unit may adjust the control gain to have the same control gain in accordance with the temperature detected by the temperature detecting unit and the type of the operation.

Figure 13:
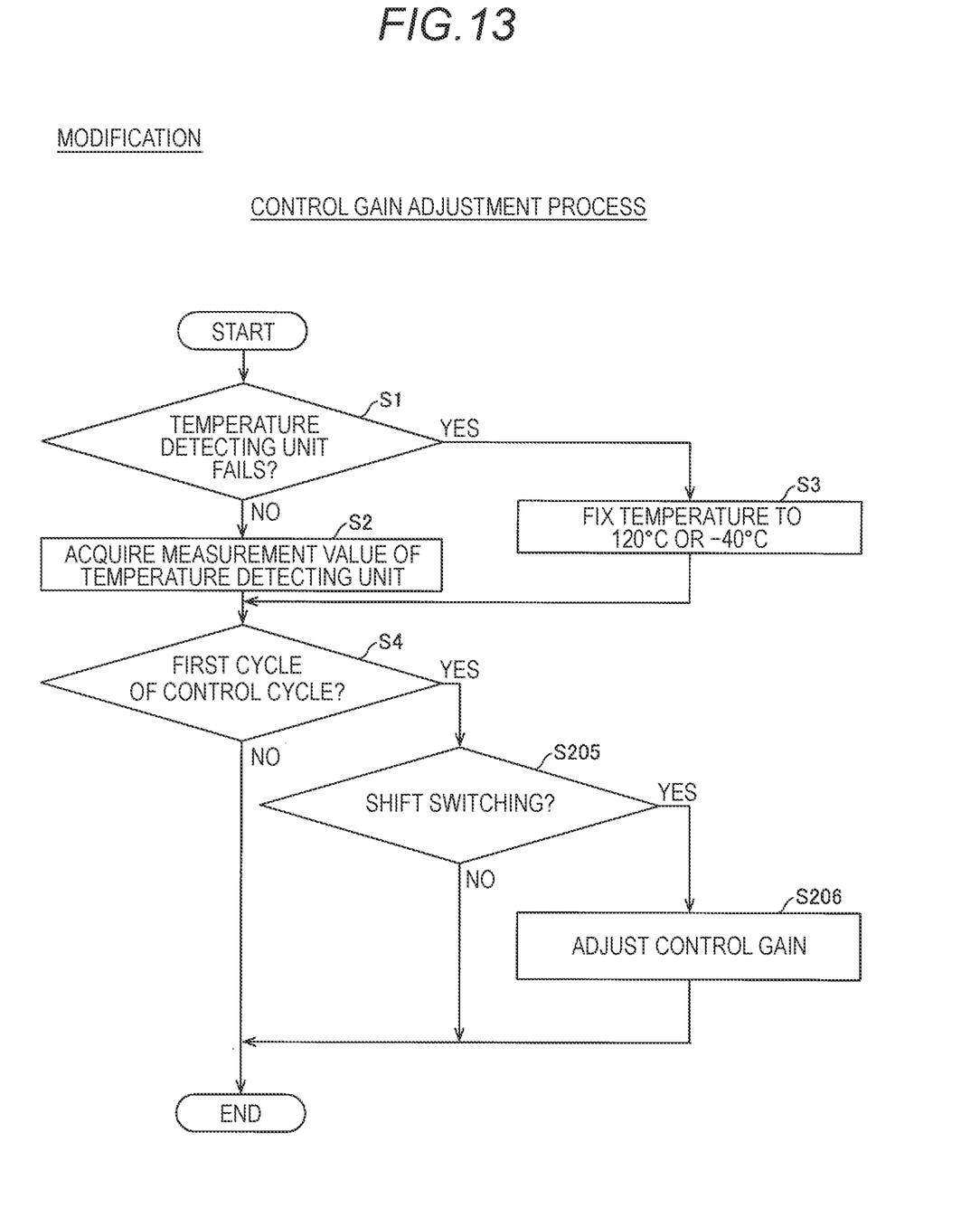
FIG. 13 is a flowchart showing a control gain adjustment process of a shift device according to a modification of the embodiment.

In addition, in the embodiment described above, the control unit 16 is configured to determine whether the type of the operation of the shift device 100 notified from the control device is the shift switching operation and whether the type of the operation is the learning operation, and this disclosure is not limited thereto. In this disclosure, the control unit may determine only whether the type of the operation of the shift device notified from the control device is the shift switching operation. That is, as shown in FIG. 13, after steps S1 to S4, which are the same as steps S1 to S4 shown in FIG. 12, the control unit 16 determines whether the shift switching operation is performed in step S205. Here, in the case of the shift switching operation, the process proceeds to step S206, the control gain is adjusted, and then the control gain adjustment process is ended. When the shift switching operation is not performed, the control gain adjustment process is ended as it is.

In addition, in the embodiment described above, for the convenience of description, an example is shown in which the control process of the control unit 16 is described by using a flow-driven type flowchart in which the process is sequentially performed along the process flow, and this disclosure is not limited thereto. In this disclosure, the control process of the control unit may be performed by an event-driven type process in which the process is executed in event units. In this case, the type may be completely event-driven, or a combination of event-driven and flow-driven.

A shift device according to an aspect of this disclosure includes a shift switching member including plural valleys corresponding to shift positions, a driving unit including a motor, the motor including a rotor and a stator, and configured to drive the shift switching member, a temperature detecting unit configured to detect a temperature of the motor, and a control unit configured to adjust a control gain based on the temperature detected by the temperature detecting unit.

In the shift device according to the aspect of this disclosure, as described above, the control unit configured to adjust the control gain based on the temperature detected by the temperature detecting unit is provided. Accordingly, by adjusting the control gain based on the temperature of the motor detected by the temperature detecting unit, a voltage supplied to the motor can be appropriately adjusted in accordance with a change in resistance of coils of the motor and a change in a viscosity of grease due to a temperature change, and thus a magnetic flux flowing through the motor can be appropriately adjusted. As a result, a torque of the motor can be stabilized regardless of the temperature of the motor.

In the shift device according to the aspect, it is preferable that the control unit adjusts the control gain at an initial stage of driving of the motor.

According to this configuration, by adjusting the control gain at the initial stage of the driving of the motor, the voltage supplied to the motor can be appropriately adjusted from the initial stage of the driving of the motor, and thus the magnetic flux flowing through the motor can be appropriately adjusted from the initial stage of the driving of the motor. As a result, the motor can output a stable torque from the initial stage of the driving of the motor regardless of the temperature of the motor.

In the shift device according to the aspect, it is preferable that the control unit is configured to perform control to set the control gain to a smaller one of a high temperature side control gain corresponding to a high temperature side temperature detected by the temperature detecting unit and a low temperature side control gain corresponding to a low temperature side temperature detected by the temperature detecting unit when the temperature detecting unit fails.

According to this configuration, when the temperature detecting unit fails, the smaller one of the high temperature side control gain and the low temperature side control gain is applied as the control gain, and thus a driving force of the motor can be reduced. As a result, since the shift switching member can be moved slowly, even if the temperature detecting unit fails, the shift switching member can be prevented from being excessively moved (overshoot) to a rotation angle according to the shift position.

In the shift device according to the aspect, it is preferable that the control unit is configured to perform control to estimate the control gain corresponding to the temperature detected by the temperature detecting unit by a linear interpolation based on an upper limit side temperature in a use temperature range and an upper limit side control gain that is a control gain corresponding to the upper limit side temperature, and a lower limit side temperature of the use temperature range and a lower limit side control gain that is a control gain corresponding to the lower limit side temperature.

According to this configuration, the control gain can be estimated when the upper limit side control gain and the lower limit side control gain are stored in a storage unit, and thus a storage capacity necessary for the storage unit of the control unit can be reduced as compared with a case where the control gain is estimated by a map based on the temperature of the motor (an environmental temperature) and a control gain corresponding to the temperature of the motor.

In the shift device according to the aspect, it is preferable that the control unit is configured to adjust the control gain such that the control gain changes according to the temperature detected by the temperature detecting unit and types of operation. The types of the operation include a learning operation of a valley bottom position and a shift switching operation performed in the shift device.

According to this configuration, the control gain can be adjusted not only according to the temperature detected by the temperature detecting unit but also according to the types of the operation, and thus the control gain can be adjusted to a more appropriate control gain.

In this case, it is preferable that the shift device further includes a positioning member configured to establish one of the shift positions in a state of being fitted into any one of the plural valleys of the shift switching member, and the control unit is configured to adjust the control gain such that the control gain changes according to a learning operation of a valley bottom position of each of the plural valleys into which the positioning member is fitted and a switching operation of the shift positions by changing one of the plural valleys into which the positioning member is fitted as the types of the operation.

According to this configuration, the motor can be driven with an appropriate control gain during the learning operation of the valley bottom position and the shift switching operation, and thus the positioning member can be reliably fitted into the plural valleys of the shift switching member regardless of whether the learning operation or the shift switching operation is performed.

In the shift device according to the aspect, the following configurations are also conceivable.

Appendix 1

That is, in the shift device that adjusts the control gain at the initial stage of the driving of the motor, the control unit adjusts the control gain in a first cycle of control cycles for the motor in the initial stage of the driving of the motor.

According to this configuration, by adjusting the control gain in the first cycle of the control cycles, the voltage supplied to the motor can be appropriately adjusted from a driving start point of the motor, and thus the magnetic flux flowing through the motor can be appropriately adjusted from the driving start point of the motor. As a result, regardless of the temperature of the motor, the motor can output a stable torque from the driving start point.

Appendix 2

In the shift device that sets the control gain to the high temperature side control gain when the temperature detecting unit fails, the control unit performs control to set a smaller one of an upper limit control gain corresponding to an upper limit temperature of the use temperature range or a lower limit control gain corresponding to a lower limit temperature of the use temperature range as the control gain when the temperature detecting unit fails.

According to this configuration, the minimum control gain is applied among the control gains, the driving force of the motor can be further reduced, and thus the shift switching member can be moved more slowly. As a result, the shift switching member can be further prevented from being excessively moved (overshoot) to the rotation angle corresponding to the shift position.

Appendix 3

In the shift device including the control unit that estimates the control gain corresponding to the temperature detected by the temperature detecting unit by the linear interpolation, the control unit performs control to estimate the control gain by a linear interpolation based on the upper limit temperature as the upper limit side temperature and the upper limit control gain as the upper limit side control gain, a change point that is a temperature at which a slope of a correlation expression defined by the temperature detected by the temperature detecting unit and the control gain changes and a change point control gain that is a control gain corresponding to the change point, a predetermined temperature between the change point and the upper limit side temperature and a predetermined control gain that is a control gain corresponding to the predetermined temperature, and the lower limit temperature as the lower limit side temperature and the lower limit control gain as the lower limit side control gain.

According to this configuration, the control gain can be estimated by the linear interpolation by adding the change point control gain and the predetermined control gain to the upper limit side control gain and the lower limit side control gain, and thus a more appropriate control gain can be estimated.

Appendix 4

In this case, the control unit performs control to estimate the control gain by a linear interpolation based on a first correlation expression acquired by the upper limit temperature and the upper limit control gain and the predetermined temperature and the predetermined control gain when the temperature detected by the temperature detecting unit is equal to or higher than the predetermined temperature and equal to or lower than the upper limit temperature, performs control to estimate the control gain by a linear interpolation based on a second correlation expression acquired by the predetermined temperature and the predetermined control gain and the change point and the change point control gain when the temperature detected by the temperature detecting unit is equal to or higher than the change point and less than the predetermined temperature, and performs control to estimate the control gain by a linear interpolation based on a third correlation expression acquired by the lower limit temperature and the lower limit control gain and the change point and the change point control gain when the temperature detected by the temperature detecting unit is equal to or higher than the lower limit temperature and less than the change point.

According to this configuration, by estimating the control gain by the first correlation expression, the second correlation expression, and the third correlation expression, a more appropriate control gain can be estimated while reducing the storage capacity necessary for the storage unit of the control unit as compared with the case where the control gain is estimated by a map based on the temperature of the motor (the environmental temperature) and a control gain corresponding to the temperature of the motor.

Appendix 5

In the shift device according to the aspect, the control unit includes a first control unit that calculates a target rotation angular speed of the motor based on a target rotation angle of the motor and a rotation angle of the motor, and a second control unit that calculates a target torque of the motor based on the target rotation angular speed and the rotation angular speed of the motor, and the control unit adjusts control gains included in the first control unit and the second control unit based on the temperature detected by the temperature detecting unit.

According to this configuration, the control gains of the first control unit and the second control unit can be adjusted to control gains according to the temperature, and thus the target rotation angular speed of the motor and the target torque of the motor can be calculated with more appropriate values.

Appendix 6

In this case, the control unit further includes a current vector control unit that controls the driving of the motor based on the target torque calculated by the second control unit, the rotation angular speed of the motor, the rotation angle of the motor, and a current flowing in the motor, and the control unit adjusts a control gain of the current vector control unit based on the temperature detected by the temperature detecting unit.

According to this configuration, the control gain of the current vector control unit can be adjusted to the control gain according to the temperature, and thus driving control of the motor can be more appropriately performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shift device comprising:
a shift switching member including plural valleys corresponding to shift positions;
a driving unit including a motor, the motor including a rotor and a stator, and configured to drive the shift switching member;
a temperature detecting unit configured to detect a temperature of the motor; and
a control unit configured to adjust a control gain based on the temperature detected by the temperature detecting unit.

2. The shift device according to claim 1, wherein
the control unit adjusts the control gain at an initial stage of driving of the motor.

3. The shift device according to claim 1, wherein
the control unit is configured to perform control to set the control gain to a smaller one of a high temperature side control gain corresponding to a high temperature side temperature detected by the temperature detecting unit and a low temperature side control gain corresponding to a low temperature side temperature detected by the temperature detecting unit when the temperature detecting unit fails.

4. The shift device according to claim 1, wherein
the control unit is configured to perform control to estimate the control gain corresponding to the temperature detected by the temperature detecting unit by a linear interpolation based on an upper limit side temperature in a use temperature range and an upper limit side control gain that is a control gain corresponding to the upper limit side temperature, and a lower limit side temperature of the use temperature range and a lower limit side control gain that is a control gain corresponding to the lower limit side temperature.

5. The shift device according to claim 1, wherein
the control unit is configured to adjust the control gain such that the control gain changes according to the temperature detected by the temperature detecting unit and types of operation.

6. The shift device according to claim 5, further comprising:
a positioning member configured to establish one of the shift positions in a state of being fitted into any one of the plural valleys of the shift switching member, wherein
the control unit is configured to adjust the control gain such that the control gain changes according to a learning operation of a valley bottom position of each of the plural valleys into which the positioning member is fitted and a switching operation of the shift positions by changing one of the plural valleys into which the positioning member is fitted as the types of the operation.

* * * * *